United States Patent [19]

Hoppe et al.

[11] Patent Number: 4,749,922
[45] Date of Patent: Jun. 7, 1988

[54] ELECTRIC MOTOR CONTROL CIRCUIT

[75] Inventors: Willy Hoppe, Achern; Helmut Steinmann, Baden-Baden, both of Fed. Rep. of Germany

[73] Assignee: Robert Bosch GmbH, Stuttgart, Fed. Rep. of Germany

[21] Appl. No.: 40,785

[22] PCT Filed: Mar. 5, 1986

[86] PCT No.: PCT/DE86/00085
§ 371 Date: Feb. 26, 1987
§ 102(e) Date: Feb. 26, 1987

[87] PCT Pub. No.: WO87/00363
PCT Pub. Date: Jan. 15, 1987

[30] Foreign Application Priority Data

Jul. 6, 1985 [DE] Fed. Rep. of Germany ....... 3524267

[51] Int. Cl.$^4$ .............................................. H02P 7/00
[52] U.S. Cl. ..................................... 318/257; 318/293; 318/440
[58] Field of Search ............... 318/255, 256, 257, 268, 318/272, 280, 293, 599, 440, 442

[56] References Cited

U.S. PATENT DOCUMENTS

| 3,694,721 | 9/1972 | Henry | 318/258 |
| 3,976,925 | 8/1976 | Rudich | 318/257 |
| 3,989,992 | 11/1976 | Schmidt | 318/257 |
| 4,471,280 | 9/1984 | Stack | 318/256 X |
| 4,514,666 | 4/1985 | Suzuki | 318/257 X |

FOREIGN PATENT DOCUMENTS

| 2709464 | 9/1978 | Fed. Rep. of Germany . |
| 2719200 | 11/1978 | Fed. Rep. of Germany . |
| 60-162495 | 8/1985 | Japan | 318/257 |

Primary Examiner—Bentsu Ro
Attorney, Agent, or Firm—Michael J. Striker

[57] ABSTRACT

A control circuit for an electric motor is proposed, whose rate of rotation and rotational direction depends on a control signal (Ue) at the input terminal (10). The rotational direction is given by means of a determined control signal level being exceeded or fallen short of. The rate of rotation is controlled by means of a pulse width modulation of the control signal (Ue). There is a nonlinear relationship between the change in the pulse duty factor of the pulse width modulation and the control signal. The mean adjusting speed of an actuating motor accordingly adapts to the control deviation signal of an actuating control.

6 Claims, 2 Drawing Sheets

ELECTRIC MOTOR CONTROL CIRCUIT

PRIOR ART

The invention is based on a control circuit for an electric motor whose rotational direction and rate of rotation are controlled by a control signal whereby the rotational direction is controlled upon exceeding or falling below a predetermined level of the control signal, and the rate of rotation is controlled by the pulse-width modulation of the control signal. Such a circuit arrangement, which generates a bidirectional pulse signal to two outputs as a function of the amplitude and the polarity of an analog input signal, is known from the company publication: "Voltage Regulators with Applications", pages 111 to 118, Astronic, Winzererstrasse 47d, 8000 Munich 40, 1982. This circuit arrangement is offered in the form of an integrated circuit. It is used in servo systems which are controlled by electric motors and for controlling the rate of rotation of electric motors. The integrated switching circuit contains a delta connected voltage generator, a control circuit for the delta voltage generator and two comparators. The pulse width modulation is effected by adding the delta voltage and the analog control signal and subsequently comparing the resulting signal with an upper and lower threshold with the aid of the two comparators. There is always a linear relationship between the analog control signal and the pulse width.

ADVANTAGES OF THE INVENTION

In contrast, the control circuit, according to the invention, with the characterizing features of claim 1 has the advantage that a pulse width modulation is effected with a simpler circuit, wherein a nonlinear relationship can be predetermined between the analog control signal and the pulse width.

The control circuit contains few constructional elements and therefore makes possible a construction in series production at low cost. It is particularly suitable for adapting the mean adjusting rate of an actuating motor to the level of the analog control signal, which, for example, can be a command variable or the control deviation signal of an actuating control. Within the range of small deviations between the actual and desired values of the rate of rotation of the motor, the nonlinearity offers the advantage of a more rapid elimination of the deviation without the risk of overshooting the desired value.

Other details and advantageous developments of the control circuit, according to the invention, follow from the subclaims in connection with the following description.

DRAWING

DESCRIPTION OF THE EMBODIMENT EXAMPLE

Figure 1:
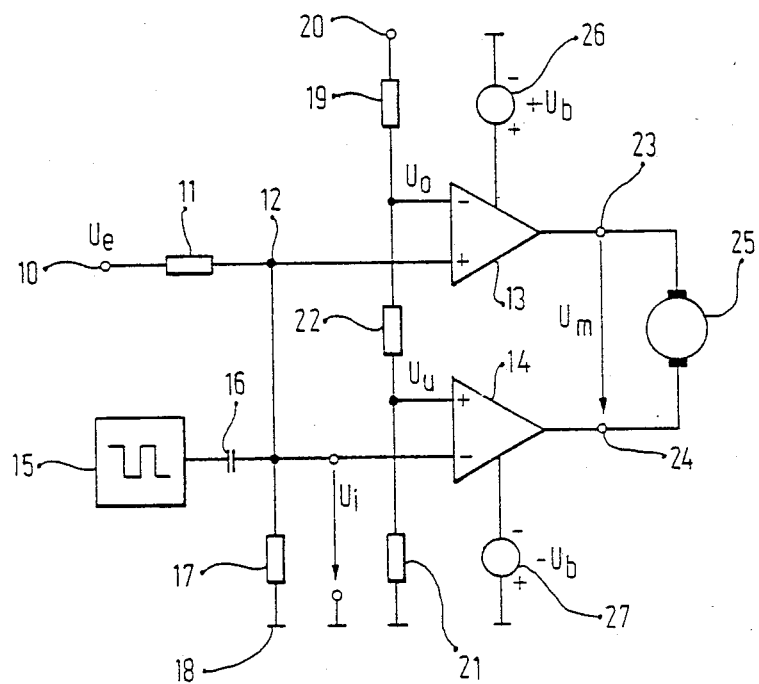
FIG. 1 shows a wiring diagram of the control circuit, according to the invention.

In the wiring diagram (FIG. 1) of the control circuit, a control signal Ue arrives at an input terminal 10 and then at a junction 12 via a resistor 11. The non-inverting input of a first operational amplifier 13 and the inverting input of a second operational amplifier 14 are connected at the junction 12. The signal of a rectangular wave generator 15 is connected to the junction 12 via a capacitor 16. Moreover, the junction 12 is connected with a circuit ground 18 via a resistor 17. The inverting input of the first operational amplifier 13 is connected with a supply voltage of the control circuit at the connection 20 via a resistor 19 and the non-inverting input of the second operational amplifier 14 is connected with the circuit ground 18 via a resistor 21. A resistor 22 is located between the inverting input of the first operational amplifier 13 and the non-inverting input of the second operational amplifier 14. An electric motor 25 is connected between the output 23 of the first operational amplifier 13 and the output 24 of the second operational amplifier 14. The positive pole of a first voltage source 26 is connected to the first operational amplifier 13 and its negative pole is connected to the circuit ground 18. A second voltage source 27 has its negative pole connected to the second operational amplifier 14 and its positive pole connected to the circuit ground 18.

The control circuit, according to the invention, works in the following manner: At the junction 12 the attenuation control signal Ue at the input terminal 10 is added to a pulse-shaped voltage. The weakening of the control signal Ue is determined by a voltage divider circuit to the two resistors 11, 17. The pulse-shaped voltage is obtained after differentiation of the output voltage of the rectangular wave generator 15 with the aid of the capacitor 16 and the resistor 17. The pulse-shaped voltage consists of positive and negative needle pulses with a subsequent exponentially damped waveform, wherein the needle pulses occur in the rising and falling sides of the rectangular wave signal. The exponentially damped waveform depends on the values of the capacitor 16 and the parallel equivalent circuit of the two resistors 11, 17. This internal signal voltage Ui at the junction 12 is also connected to the non-inverting input of the first operational amplifier 13 and to the inverting input of the second operational amplifier 14, which are both wired as comparators. The switching threshold of the two comparators is derived by means of a voltage divider circuit including the three resistors 19, 22, 21, which are connected in series, the voltage divider circuit being connected between the supply voltage of the control circuit at the connection 20 and the circuit ground 18. The upper threshold voltage Uo occurs between the two resistors 19, 22 and is applied to the inverting input of the first operational amplifier 13. The lower threshold voltage Uu occurs between the resistors 21, 22 and is applied to the non-inverting input of the second operational amplifier 14.

Figure 2:
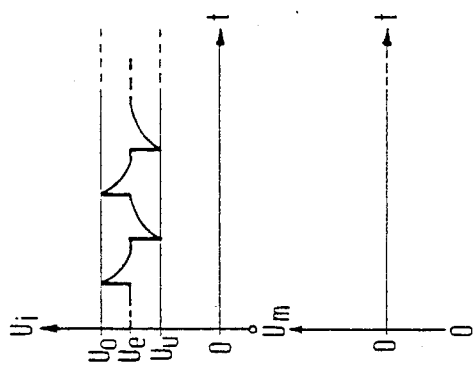

The output of the two operational amplifiers 13, 14 is constructed in each instance as a power semi-bridge circuit. The electric motor 25 is connected via these power semi-bridges either to one of the two voltage sources 26, 27, which have a voltage of +Ub or −Ub, or to none at all. The exact control of the electric motor 25 is explained with the aid of FIGS. 2 to 4:

FIG. 2 shows the case in which the electric motor 25 obtains no power. If the internal signal voltage Ui lies within the voltage range determined by the upper switching threshold Uo and the lower switching threshold Uu, then the outputs 23, 24 of the two operational amplifiers 13, 14 are connected to the circuit ground 18.

Figure 3:
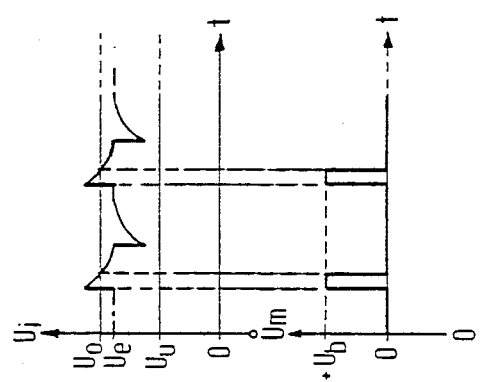

FIG. 3 shows the example of a positive displacement of the control signal Ue at the input terminal 10. The positive "needles" of the internal signal voltage Ui exceed the upper switching threshold Uo of the first operational amplifier 13, which is wired as a comparator. As long as the upper switching threshold Uo of the first operational amplifier 13 is exceeded, its output 23 is connected with the positive pole of the voltage source 26. In addition, the output 24 of the second operational amplifier 13 is connected to the circuit ground and the voltage Um for a rotational direction, which voltage is approximately equal to the voltage +Ub of the first voltage source 26, is accordingly connected to the electric motor 25.

Figure 4:
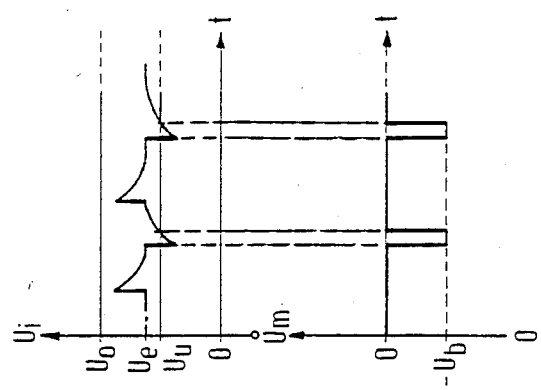
FIGS. 2 to 4 show the dependence of the control voltage Ue on an internal signal voltage Ui.

FIG. 4 shows the case of a negative displacement of the control signal at the input terminal 10. If the internal signal voltage Ui falls below the lower switching threshold Uu of the second operational amplifier 14, which is wired as a comparator, then its output 24 is connected with the negative pole of the second voltage source 27. The output 23 of the first operational amplifier 13 is connected to the circuit ground 18. The voltage Um for the opposite running direction, which voltage is approximately equal to the voltage −Ub of the second voltage source 27, is connected to the electric motor 25.

The nonlinear relationship between the control signal and the pulse width occurs to the following manner: if the upper or the lower switching threshold, as shown in FIG. 3 of 4, is only slightly exceeded or fallen short of, respectively, a comparatively short power supply pulse is generated in a positive or negative direction. On the other hand, if the switching thresholds are exceeded or fallen short of to a more considerable extent this leads to a comparatively long positive or negative power supply pulse. Small deviations of the actual value of the rate of rotation of the electric motor 25 from the desired value are accordingly controlled in a "smooth" manner to a certain extent. Larger deviations, on the other hand, lead to a more rapid follow-up.

The nonlinearity depends on the exponential drop of the pulse-shaped voltage. It is determined by means of the value of the capacitor 16, the value of the resistor 17 and the value of the resistor 11, which for an alternating voltage is likewise connected to the circuit ground 18. The amplitude of the positive and negative needle pulses depends additionally on the amplitude of the rectangular wave voltage as well as its frequency. The frequency of the rectangular wave voltage is selected in such a way that a continuous current flow is adjusted at the inductive load which in addition to a work load is represented by the electric motor 25.

We claim:

1. A circuit for controlling rotational direction and rate of rotation of an electric motor, comprising a source of a first drive voltage connected to said motor via a first comparator, a source of a second drive voltage of opposite polarity connected to said motor via a second comparator, each of said comparators having two inputs, one input of said first comparator being connected to a first reference voltage to determine an upper threshold, and one input of said second comparator being connected to a second reference voltage to determine a lower threshold, a rectangular wave generator connected via a differentiator to the second input of each of said comparators to apply thereto differentiated pulses of opposite polarity, and a source of a control signal connected to the second input of each of said comparators to superpose said differentiated pulses whereby said first drive voltage activates said motor in a rotational direction when the resulting superposed signal exceeds said upper threshold, said second drive voltage activates said motor in the opposite rotational direction when said superposed signal falls below said lower threshold, and the rate of rotation being controlled by the pulse width modulation of said control signal.

2. A circuit according to claim 1, wherein said upper threshold is determined by said first reference voltage at the inverting input of said first comparator which comprises a first operational amplifier, and said lower threshold is determined by said second reference voltage at the non-inverting input of said second comparator which comprises a second operational amplifier.

3. A circuit according to claim 2, wherein said first and second reference voltages are determined by means of a voltage divider arrangement.

4. A circuit according to claim 3, wherein said electric motor (25) is connected to the output of said first and second operational amplifiers which contain a power semi-bridge output stage in each instance.

5. A circuit as defined in claim 1 wherein said differentiator is an RC member.

6. A circuit as defined in claim 1 wherein said differentiated pulses of opposite polarity are needle pulses with an exponentially damped slope to produce a nonlinear pulse width modulation of said control signal.

* * * * *